United States Patent
Iida et al.

(10) Patent No.: US 9,600,160 B2
(45) Date of Patent: Mar. 21, 2017

(54) IMAGE PROCESSING DEVICE, IMAGE PROCESSING METHOD, AND PROGRAM

(71) Applicant: Sony Corporation, Tokyo (JP)

(72) Inventors: Tatsuhiro Iida, Tokyo (JP); Shogo Kimura, Saitama (JP)

(73) Assignee: Sony Corporation, Tokyo (JP)

( * ) Notice: Subject to any disclaimer, the term of this patent is extended or adjusted under 35 U.S.C. 154(b) by 118 days.

(21) Appl. No.: 14/526,645

(22) Filed: Oct. 29, 2014

(65) Prior Publication Data

US 2015/0162049 A1 Jun. 11, 2015

(30) Foreign Application Priority Data

Dec. 9, 2013 (JP) ................. 2013-254031

(51) Int. Cl.
| | |
|---|---|
| *G06F 3/0484* | (2013.01) |
| *G11B 27/00* | (2006.01) |
| *H04N 5/783* | (2006.01) |
| *H04N 21/432* | (2011.01) |
| *H04N 21/44* | (2011.01) |
| *H04N 21/472* | (2011.01) |

(52) U.S. Cl.
CPC ........ *G06F 3/04845* (2013.01); *G11B 27/007* (2013.01); *H04N 5/783* (2013.01); *H04N 21/4325* (2013.01); *H04N 21/44008* (2013.01); *H04N 21/47205* (2013.01); *H04N 21/47217* (2013.01)

(58) Field of Classification Search
CPC ......... G06T 13/00; G06T 13/40; G06T 13/80; G06T 2207/30241; G06T 15/005; G06T 13/20; G06T 2210/52; G06T 1/20; A63F 2300/5553; A63F 2300/6607; A63F 2300/8011; A63F 2300/64; A63F 2300/534; A63F 2300/538; G06F 11/323; G06F 3/04817; G06F 17/30247; H04N 21/4312; H04N 19/436; G06K 9/00362; G09G 2352/00

See application file for complete search history.

(56) References Cited

U.S. PATENT DOCUMENTS

| | | | | |
|---|---|---|---|---|
| 6,636,220 | B1 * | 10/2003 | Szeliski | ................. G06T 13/80 345/475 |
| 7,042,493 | B2 | 5/2006 | Prandoni et al. | |
| 8,217,958 | B1 * | 7/2012 | Baraff | ..................... G06T 13/20 345/589 |

(Continued)

FOREIGN PATENT DOCUMENTS

| | | |
|---|---|---|
| JP | 2001-054607 A | 2/2001 |
| JP | 2003-018461 A | 1/2003 |

(Continued)

*Primary Examiner* — Haixia Du
(74) *Attorney, Agent, or Firm* — Michael Best & Friedrich LLP

(57) ABSTRACT

There is provided an image processing device including a moving image generation unit configured to generate a parallelly animated moving image in which a plurality of object images are each parallelly animated, the plurality of the object images having been selected from a series of object images that have been generated by extracting a moving object from frame images of a source moving image, and an image output unit configured to output the parallelly animated moving image.

18 Claims, 10 Drawing Sheets

(56) References Cited

U.S. PATENT DOCUMENTS

| | | | |
|---|---|---|---|
| 2004/0017504 A1* | 1/2004 | Prandoni | H04N 5/2625 348/370 |
| 2008/0094472 A1 | 4/2008 | Ayer et al. | |
| 2009/0244318 A1 | 10/2009 | Makii | |
| 2011/0305438 A1 | 12/2011 | Torii et al. | |
| 2012/0105657 A1 | 5/2012 | Yokohata et al. | |
| 2014/0361974 A1* | 12/2014 | Li | G06F 3/005 345/156 |

FOREIGN PATENT DOCUMENTS

| | | |
|---|---|---|
| JP | 2004-186994 A | 7/2004 |
| JP | 2010-233001 A | 10/2010 |
| JP | 2011-114815 A | 6/2011 |
| JP | 2012-004739 A | 1/2012 |

\* cited by examiner

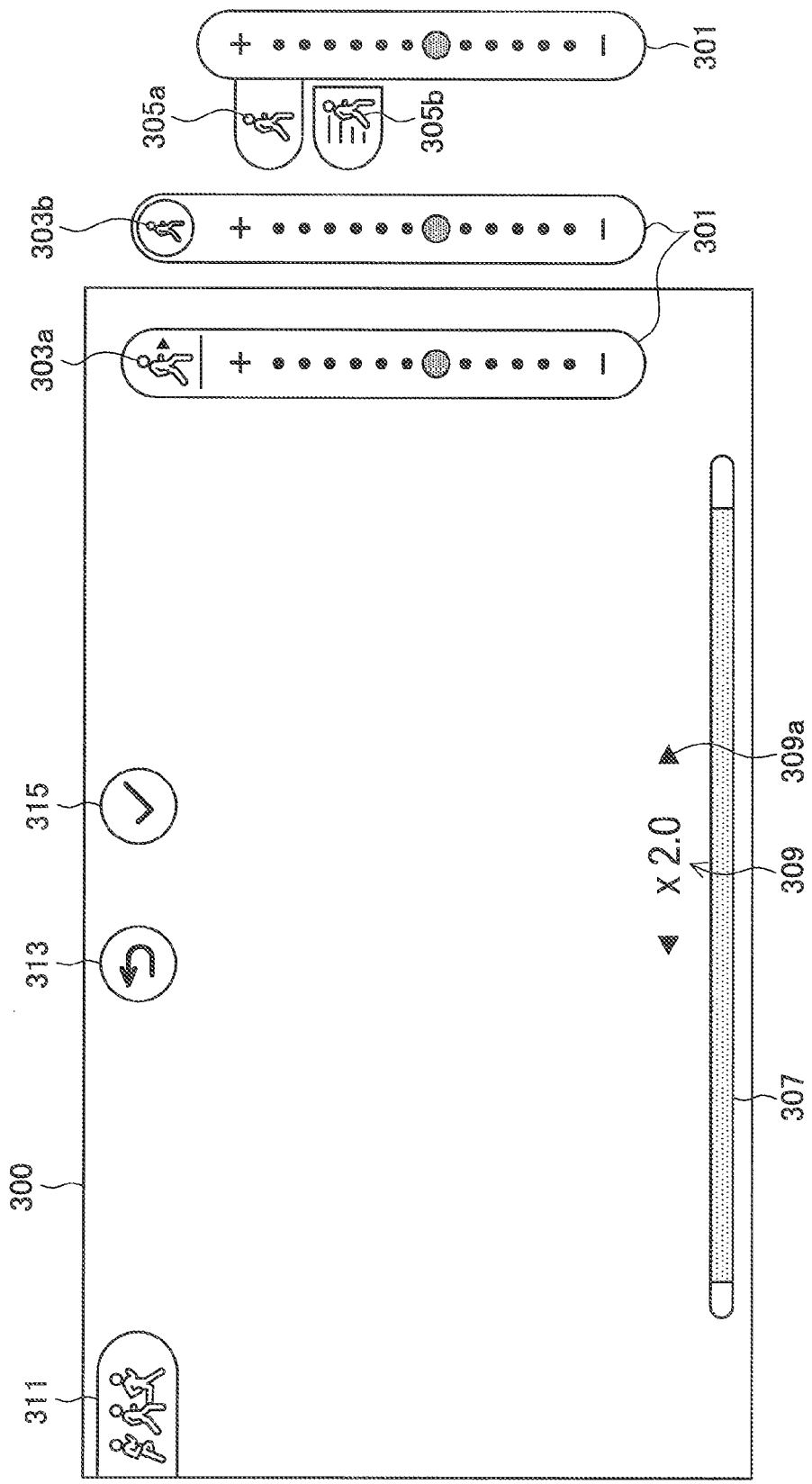

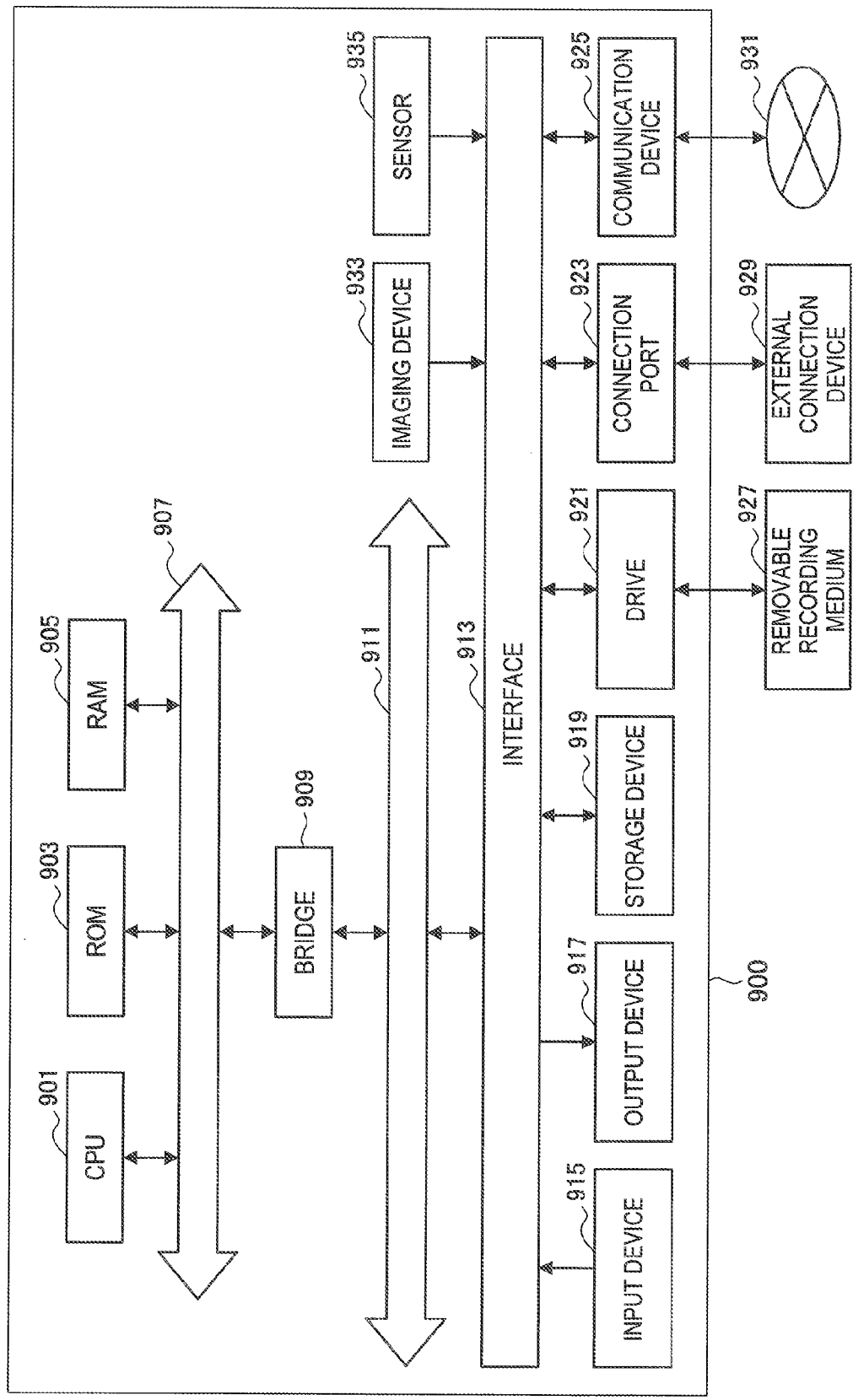

IMAGE PROCESSING DEVICE, IMAGE PROCESSING METHOD, AND PROGRAM

CROSS REFERENCE TO RELATED APPLICATIONS

This application claims the benefit of Japanese Priority Patent Application JP 2013-254031 filed Dec. 9, 2013, the entire contents of which are incorporated herein by reference.

BACKGROUND

The present disclosure relates to an image processing device, an image processing method, and a program.

Many technologies have been proposed to improve expressiveness of moving images. For example, JP 2012-4739A (corresponding U.S. publication US 2011/0305438 A1) describes a technology of improving usability for a user with respect to a playback operation such as playback, pause, frame-by-frame playback, and pause release that are performed on moving image data. Such technologies improves the expressiveness of the moving images in terms of a playback capability by which the user can slowly play back a desired section of the moving image.

However, for example, in a case where a user wants to watch an identical section repeatedly, it is necessary for the technology described in JP2012-4739 A to rewind the playback or to set the section to be repeatedly played back in response to a user operation. Even after the repeat playback is set, re-setting is necessary in a case of watching another section of the identical moving image repeatedly. Accordingly, there is a room for improvement with respect to usability.

Accordingly, in a nod to the above described situation, the present disclosure proposes a novel and improved image processing device, image processing method and program capable of enhancing expressiveness of moving images.

SUMMARY

According to an embodiment of the present disclosure, there is provided an image processing device including a moving image generation unit configured to generate a parallelly animated moving image in which a plurality of object images are each parallelly animated, the plurality of the object images having been selected from a series of object images that have been generated by extracting a moving object from frame images of a source moving image, and an image output unit configured to output the parallelly animated moving image.

According to another embodiment of the present disclosure, there is provided an image processing method including generating a parallelly animated moving image in which a plurality of object images are each parallelly animated, the plurality of the object images having been selected from a series of object images that have been generated by extracting a moving object from frame images of a source moving image, and outputting the parallelly animated moving image.

According to another embodiment of the present disclosure, there is provided a program for causing a computer to achieve a function of generating a parallelly animated moving image in which a plurality of object images are each parallelly animated, the plurality of the object images having been selected from a series of object images that have been generated by extracting a moving object from frame images of a source moving image, and a function of outputting the parallelly animated moving image.

By parallelly animating each of the plurality of object images, a movement of an object in a certain section is expressed in a repeating manner at shorter intervals than a case of playing back the entire moving image repeatedly. According to the above-described configuration, expressiveness of moving images is enhanced by enabling such expression.

As described above, according to one or more of the embodiments of the present disclosure, it is possible to enhance expressiveness of moving images.

BRIEF DESCRIPTION OF THE DRAWINGS

FIG. 9 is a diagram illustrating an example of a GUI according to an embodiment of the present disclosure; and FIG. 10 is a block diagram showing a hardware configuration example of an information processing device according to an embodiment of the present disclosure.

DETAILED DESCRIPTION OF THE EMBODIMENT(S)

Figure 1:
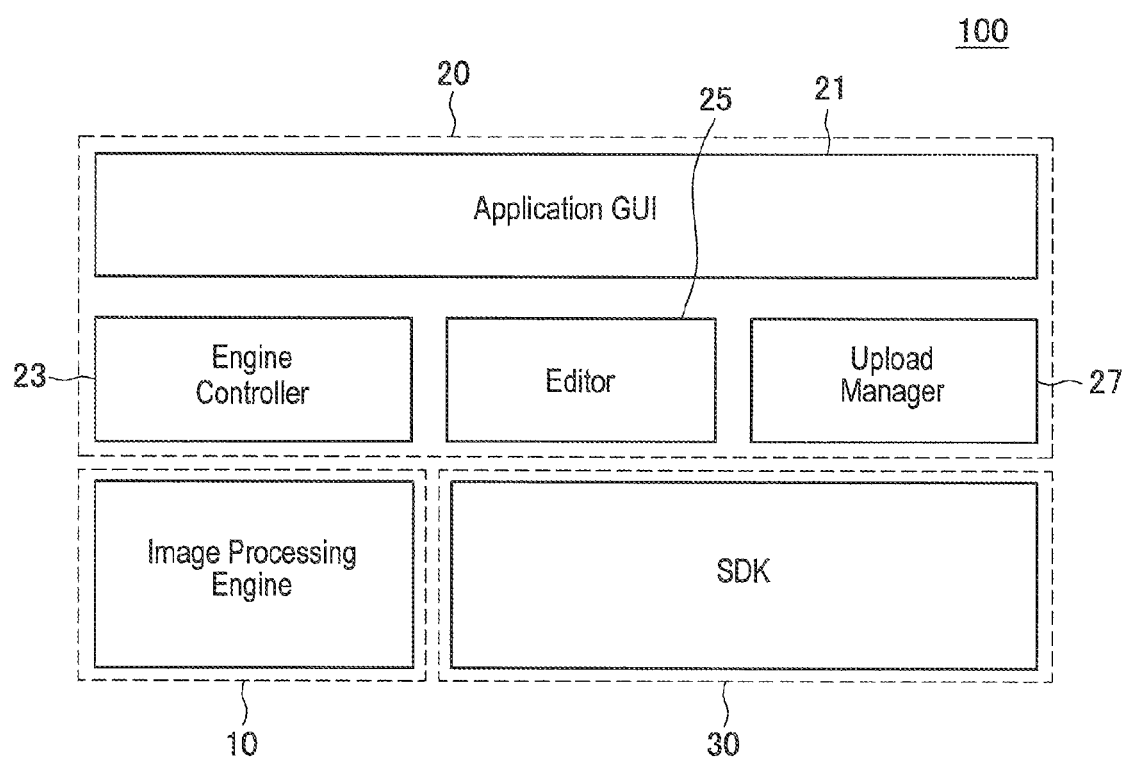
FIG. 1 is a schematic software configuration diagram of a terminal device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Schematic Configuration
1-1. Software Configuration
1-2. Functional Configuration
1-3. Flow of Data
2. Generation of Moving Image in which a plurality of Object Images are Parallelly Animated
2-1. Extraction of Object Image
2-2. Generation of Moving Image 3. Generation of Moving Image in which a Single Object Image is Animated
4. Example of GUI
5. Hardware Configuration
6. Supplement (1. Schematic Configuration)

Figure 2:
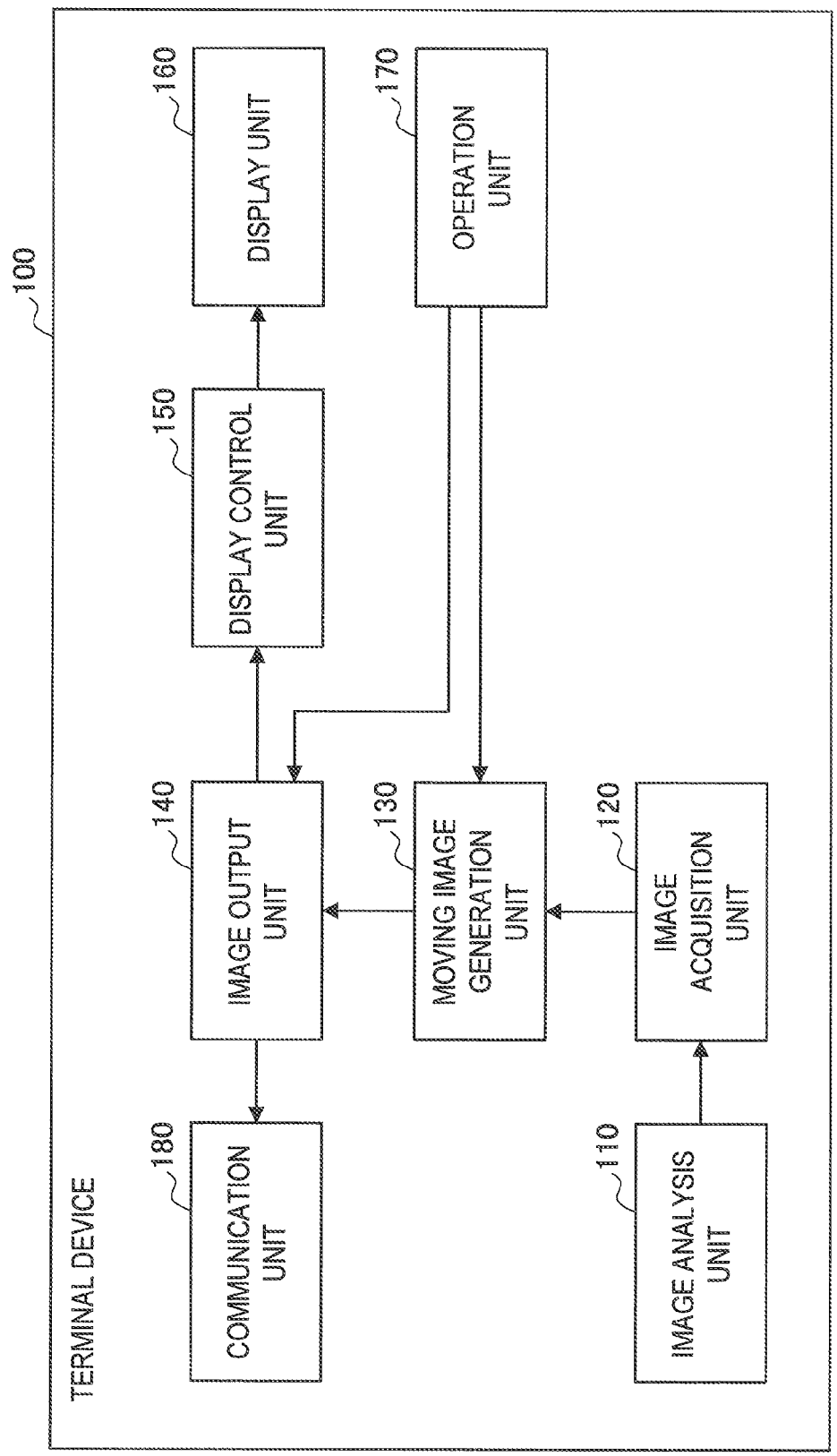
FIG. 2 is a block diagram schematically showing a functional configuration of a terminal device according to an embodiment of the present disclosure.
Figure 3:
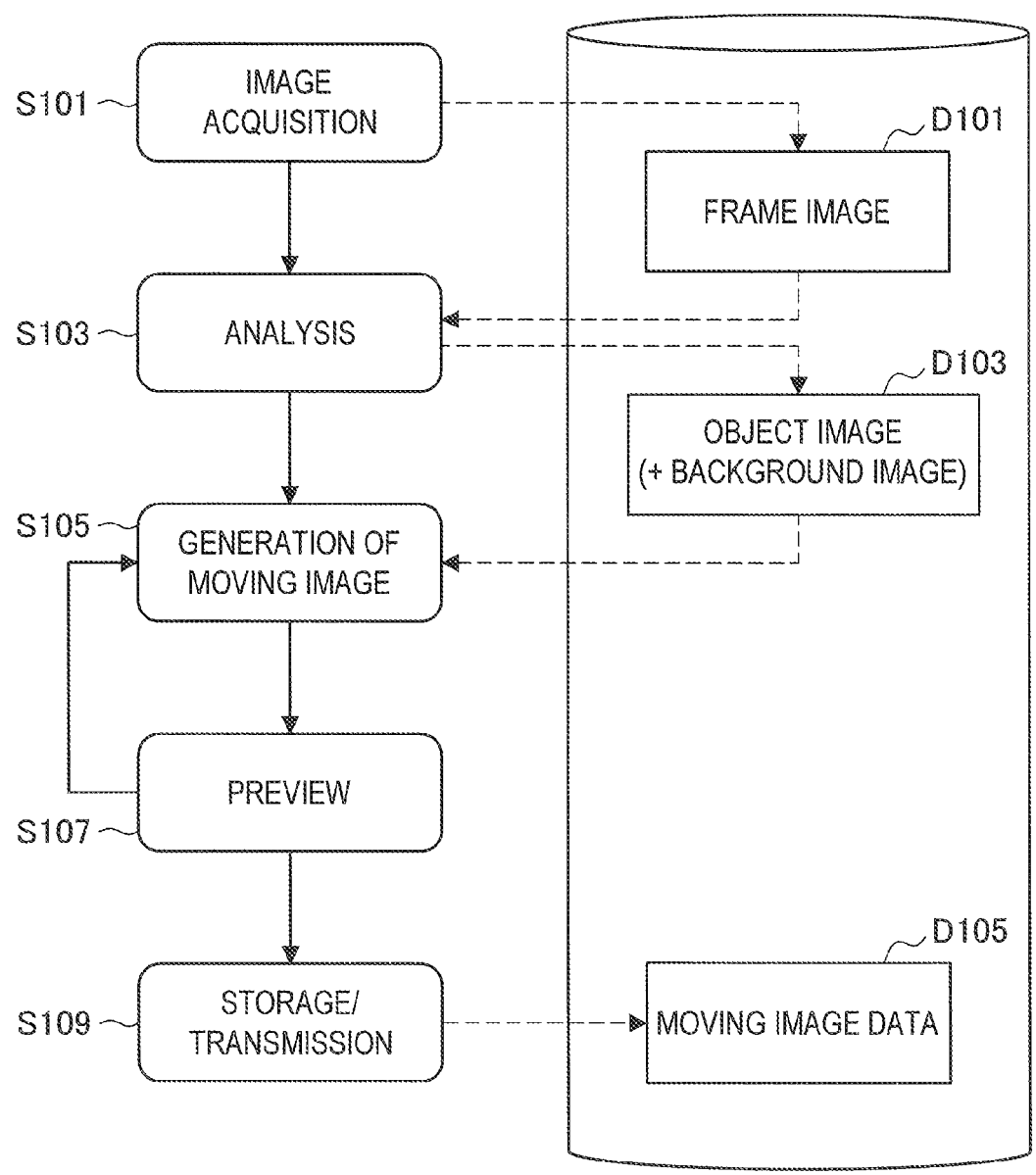
FIG. 3 is a diagram schematically illustrating a flow of data in each step of a terminal device according to an embodiment of the present disclosure.

First, with reference to FIGS. 1 to 3, a schematic configuration according to an embodiment of the present disclosure is explained. In the present embodiment, a terminal device used by a user is used as an image processing device. The terminal device may be a device having a camera function, such as a digital camera, a mobile phone (including smart phone), a tablet terminal, or a portable game machine. In this case, the terminal device can use a moving image captured by the camera function as a source of image processing described below. Alternatively, the terminal device may be a device that does not have the camera function, such as variety of PCs or media players. In this case, the terminal device can use a moving image acquired from another device via a network as a source of the image processing. Note that, in the case where the terminal device has the camera function, this terminal device can also use a moving image acquired from another device via a network as a source of the image processing.

Note that, such as a terminal device described below, a hardware configuration of an information processing device according to the present embodiment is described below. The following software configuration and functional configuration may be achieved by a processor such as a central processing unit (CPU) of the information processing device, unless otherwise specified.

(1-1. Software Configuration)

FIG. 1 is a schematic software configuration diagram of a terminal device 100 according to an embodiment of the present disclosure. With reference to FIG. 1, software of the terminal device 100 includes an image processing engine 10, an application 20, and a software development kit (SDK) 30. The image processing engine 10 is a software module for performing predetermined processing on an input image and acquiring data.

In the present embodiment, the image processing engine 10 reads, as a source, a moving image captured by an imaging device included in the terminal device 100, a moving image acquired by the terminal device 100 from another device in a network, or the like. Hereinafter, such moving images are also referred to as source moving images. The image processing engine 10 extracts a series of object images from a source moving image by executing image processing as described below. The series of object images are generated by extracting a moving object from a source moving image.

The application 20 includes a graphical user interface (GUI) 21, an engine controller 23, an editor 25, and an upload manager 27. For example, the GUI 21 causes a display of the terminal device 100 to display an operation screen as described below, and acquires a user operation performed on the operation screen, the user operation using a touchscreen, a mouse, or the like. The engine controller 23 inputs, to the image processing engine 10, an instruction to select a source or to execute processing, on the basis of the user operation via the GUI 21. The editor 25 edits a series of object images output from the image processing engine 10 on the basis of a user operation via the GUI 21. For example, the editor 25 generates a parallelly animated moving image in which respective object images are parallelly animated, the object images having been selected from a series of object images, and the editor 25 causes the display of the terminal device 100 to display the generated moving image via the GUI 21 as a preview. Alternatively, the editor 25 may generate a singly animated moving image in which a single object image is animated, the single object image having been selected from the series of object images, and the editor 25 may display the generated moving image as a preview in similar way. For example, by using an application programming interface (API) prepared as the SDK 30, the upload manager 27 enables an image generated by the application 20 using functions such as the engine controller 23 and the editor 25 to be uploaded onto a server in a network or to be transmitted to another terminal device.

The SDK 30 is a set of prepared software tools by which the application 20 uses functions provided by an operating system (OS), for example. The SDK 30 allows the application 20 to use functions such as input/output, a file operation, and communication in the terminal device 10, for example.

(1-2. Functional Configuration)

FIG. 2 is a block diagram schematically showing a functional configuration of the terminal device 100 according to an embodiment of the present disclosure. With reference to FIG. 2, the terminal device 100 includes an image analysis unit 110, an image acquisition unit 120, a moving image generation unit 130, an image output unit 140, a display control unit 150, a display unit 160, an operation unit 170, and a communication unit 180. Note that, in addition to the above-described functional configurations, the terminal device 100 may include variety of functional configurations that may be generally installed in the terminal device, such as an imaging device, a communication device, a receiving device or recording device of a broadcasting wave.

(Image Analysis Unit)

The image analysis unit 110 corresponds to the above-described image processing engine 10, for example. The image analysis unit 110 generates a series of object images by extracting a moving object from frame images of a source moving image. The series of object image may be obtained by separating an image of a region in which a motion vector exceeds a threshold from a background image in the frame images. Note that, variety of known technologies can be used for generating the series of object images, and kinds of the known technologies are not particularly limited. In addition, the region separated as the object image may substantially match with an outer shape of the moving object, or may include the object and a background part adjacent to the object, for example.

Moreover, the image analysis unit 110 may generate a background image in addition to the series of the object images. For example, the background image is generated by extracting a region other than the object from one or plurality of frame images, and by performing image composition as necessary. The background image may be displayed as a background of a moving image generated by the moving image generation unit 130, for example.

In a case where the terminal device 100 includes the imaging device in the present embodiment, the image analysis unit 110 may use a moving image captured by the imaging device as a source moving image. Alternatively, the image analysis unit 110 may use a moving image received from another device via the communication device as a source moving image. Alternatively, the image analysis unit 110 may use a recorded moving image delivered via the broadcasting wave or the like as a source moving image.

(Image Acquisition Unit)

The image acquisition unit 120 corresponds to the above-described engine controller 23 of the application 20, for example. The image acquisition unit 120 acquires a series of object images output from the image analysis unit 110. As described above, the series of object images are generated by extracting a moving object from frame images of a source moving image. The image acquisition unit 120 may further acquire a background image output from the image analysis unit 110. Note that, in the present embodiment, the image acquisition unit 120 acquires a series of object images (and a background image) from the image analysis unit 110. However, in another embodiment, it is also possible for the image acquisition unit 120 to acquire a series of object images (and a background image) via the communication unit from another device having functions similar to the image analysis unit 110. Alternatively, the image acquisition unit 120 may acquire a series of object images (and a background image) that have already been stored in a storage included in the terminal device 100.

(Moving Image Generation Unit)

The moving image generation unit 130 corresponds to the above-described editor 25 of the application 20, for example. The moving image generation unit 130 selects a plurality of object images from a series of object images acquired by the image acquisition unit 120, and generates a parallelly animated moving image in which each of the selected object images are parallelly animated. Alternatively, the moving image generation unit 130 selectively generates any one of the parallelly animated moving image and a singly animated moving image in which a single object image is animated, the single object image having been selected from the series of object images acquired by the image acquisition unit 120. Here, the one or plurality of object images that are animated in the parallelly animated moving image and/or the singly animated moving image may be displayed in a manner that the one or plurality of object images are overlaid on a common background image acquired by the image acquisition unit 120.

(Image Output Unit)

The image output unit 140 corresponds to the above-described editor 25 of the application 20, for example. The image output unit 140 outputs a moving image generated by the moving image generation unit 130. For example, the image output unit 140 outputs a parallelly animated moving image in a case where the moving image generation unit 130 generates only the parallelly animated moving image. Alternatively, the image output unit 140 outputs any one of a parallelly animated moving image and a singly animated moving image in a case where the moving image generation unit 130 selectively generates any one of the parallelly animated moving image and the singly animated moving image.

(Display Control Unit/Display Unit/Operation Unit)

The display control unit 150 corresponds to the above-described the GUI 21 of the application 20, for example. The display control unit 150 causes the display unit 160 that is a display included in the terminal device 100 for example, to display a moving image output from the image output unit 140. At this time, the display control unit 150 may cause the display unit 160 to display an operation element such as a button or a slider for editing as described below, in addition to the moving image. A user operation performed on such operation elements may be acquired by the operation unit 170 including the touchscreen, the mouse, and the like of the terminal device 100 for example. On the basis of this operation, the moving image generation unit 130 may regenerate a moving image. That is, the display control unit 150 causes the display unit 160 to display a moving image as a preview image which can be further edited. Note that, a detail of edit processing using the preview image is described later.

(Communication Unit)

The communication unit 180 corresponds to the above-described upload manager 27 of the SDK 30, for example. Via the communication device of the terminal device 100, the communication unit 180 uploads a moving image output by the image output unit 140 onto the server in the network, or transmits the moving image to another terminal device. Here, it is decided whether the generated moving image is further edited or is transmitted via the communication unit 180, on the basis of a user operation performed on an operation element on the display unit 160, the user operation having been acquired by the operation unit 170. Note that, according to another embodiment, the moving image output from the image output unit 140 may be stored in the storage instead of being transmitted via the communication unit 180, and then may be viewed or transmitted later.

(1-3. Flow of Data)

FIG. 3 is a diagram schematically illustrating a flow of data in each step of the terminal device 100 according to an embodiment of the present disclosure. In FIG. 3, the following schematic steps of processing performed by the terminal device 100 are shown: image acquisition (S101), analysis (S103), editing (generation of a moving image) (S105), preview (S107), and storage/transmission (S109). In addition, data to be used in each step is shown as a frame image (D101), an object image (+ a background image) (D103), and a moving image data (D105) serving as an output image.

For example, in the terminal device 100, the image acquisition step (S101) is executed by capturing of the moving image performed by the imaging device, reception of the moving image performed by the communication device, or recording of the moving image delivered via the broadcasting wave. Alternatively, the moving image may be read from a local storage such as an HDD of the terminal device 100. Frame images (D101) of the moving image (source moving image) acquired in this step are stored in the storage.

Next, the analysis step (S103) is executed by the image analysis unit 110 of the terminal device 100. As explained above, in this step, a series of object images (D103) are generated by extracting a moving object from frame images (D101) of a source moving image. In addition, in this analysis step (S103), a background image (D103) may be generated by extracting a region other than the object image from any one of the frame images, or by compositing the regions other than the object images extracted from the frame images.

Next, the moving image generation step (S105) is executed by the moving image generation unit 130 of the terminal device 100. In this step, the moving image is generated by using the series of object images (+ background image) (D103). As already explained about the moving image generation unit 130, the moving image may be a parallelly animated moving image in which a plurality of object images are parallelly animated, the plurality of object images having been selected from the series of object images (D103), or may be a singly animated moving image in which a single object image is animated, the single object image having been selected from the series of object images (D103). The generated moving image is output by the image output unit 140.

Next, the preview step (S107) is executed by the display control unit 150 and the display unit 160 of the terminal device 100. In this step, the moving image generated in the moving image generation step (S105) is presented to the user as the preview image. The user who has referred to the preview image decides whether to further make a change to the moving image, or to perform upload of the moving image onto the server, transmission of the moving image to another terminal device, or storing of the moving image in the storage, and then the user performs an operation input for doing that on the operation unit 170.

In a case where the user operation input acquired by the operation unit 170 has instructed to further make the change to the moving image in the above-described preview step (S107), the moving image generation step (S105) is executed again under a condition designated by the user operation input. Data to be referred to at this time is the already extracted object images (+ background image) (D103). As described later, the change to be further made in the preview step (S107) in the present embodiment is change in the single or plurality of object images selected for the moving image generation performed by the moving image generation unit 130, or change in a playback speed, for example. Accordingly, in the case where the moving image generation step (S105) is executed again, it is possible to reuse the already extracted object images (+ background image) (D103), and the analysis step (S103) does not have to be executed gain.

In this way, according to the present embodiment, it is possible to reduce a computational cost for executing the moving image generation step (S105) and the preview step (S107) so as to save a system resource and it is also possible to quickly display the regenerated image. As a result, according to the present embodiment, it is possible to easily execute edit and preview of the moving image any number of times, and it is possible to make the moving image with which the user is satisfied.

In a case where the user operation input acquired by the operation unit 170 has instructed to perform upload, transmission, or storage of the generated moving image in the above-described preview step (S107), the storage/transmission step (S109) is executed. In this step, the generated moving image is transmitted or stored as moving image data (D105) to be transmitted (including to be uploaded) or to be stored.

Note that, a format of the moving image data (S105) is not particularly limited. As the format, it is possible to use not only a general format of moving image, but also variety of formats such as the graphics interchange format (GIF) and Flash (registered trademark). As described later, the moving image may be continuous shooting images in a case where its frame rate is low. Accordingly, a format of the date to be output is also not limited to formats of moving image.

(2. Generation of Moving Image in which a Plurality of Object Images are Parallelly Animated)

Figure 4:
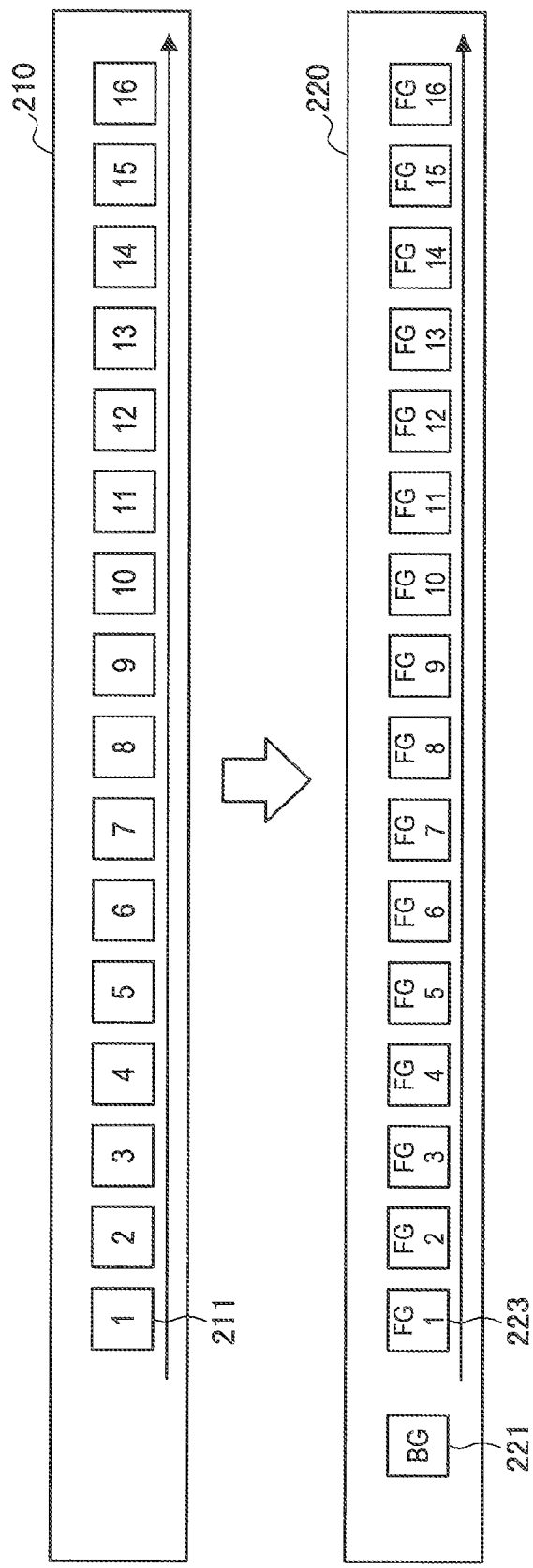
FIG. 4 is a diagram illustrating object images according to an embodiment of the present disclosure.
Figure 5:
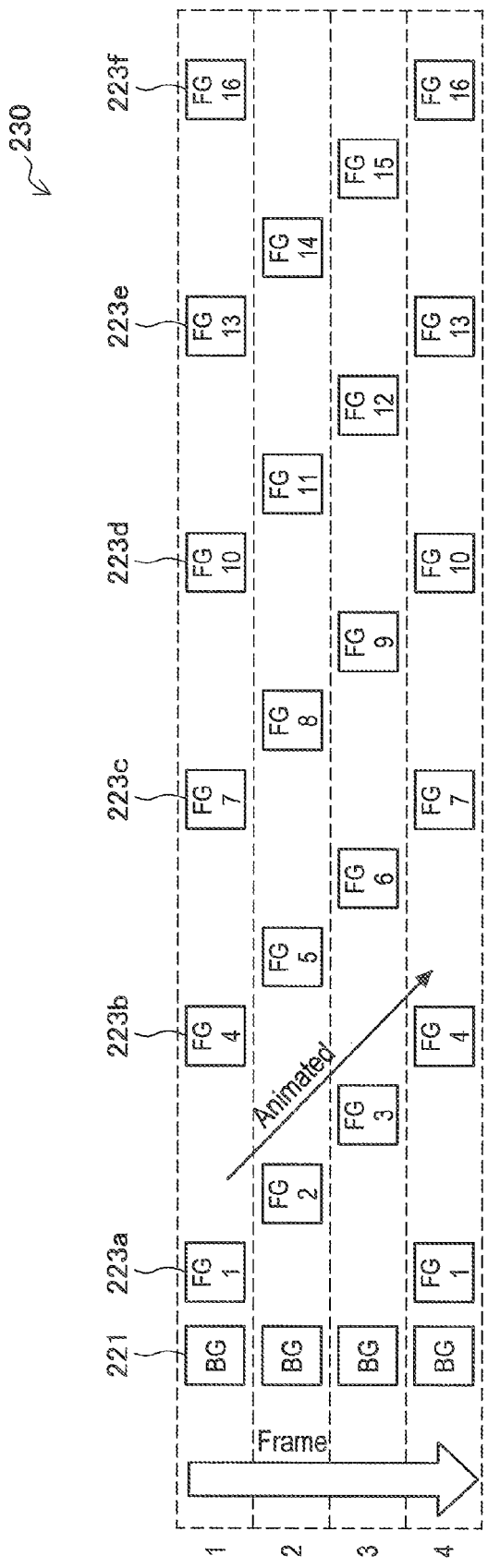
FIG. 5 is a diagram illustrating generation of a parallelly animated moving image according to an embodiment of the present disclosure.
Figure 6:
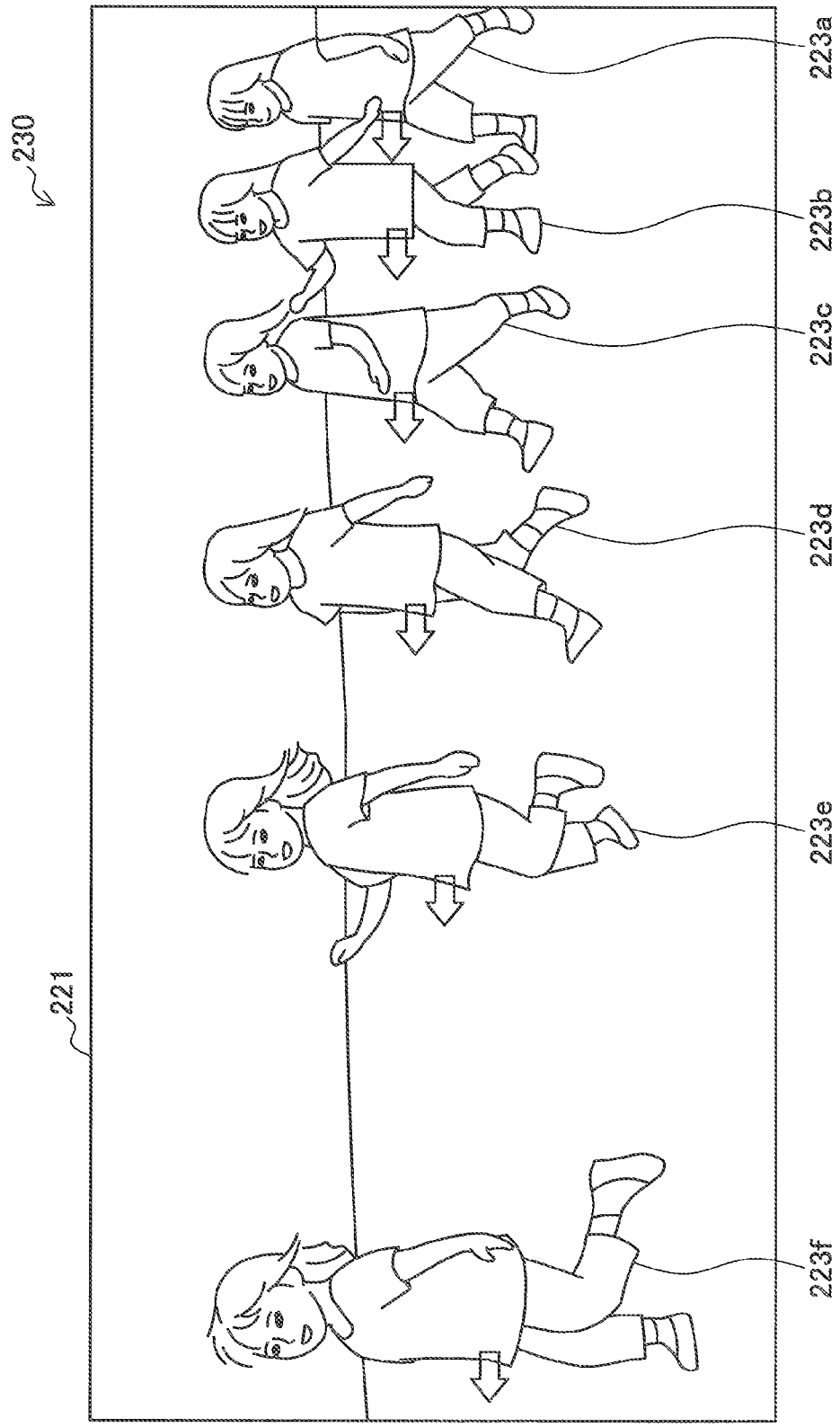
FIG. 6 is a diagram illustrating an example of a parallelly animated moving image generated in an embodiment of the present disclosure.

Next, with reference to FIGS. 4 to 6, an example of generation of a moving image (parallelly animated moving image) in which a plurality of object images are parallelly animated according to an embodiment of the present disclosure is explained.

(2-1. Extraction of Object Image)

FIG. 4 is a diagram illustrating object images according to an embodiment of the present disclosure. As described above, according to the present embodiment, the image analysis unit 110 generates a series of object images by extracting a moving object from frame images of a source moving image. In FIG. 4, a source moving image 210 and an analyzed image 220 (intermediate data) are shown.

The source moving image 210 includes frame images 211. Note that, in a case where a frame rate is low, the frame images may be read as continuous shooting images. In the diagrams, the frame images 211 marked with number 1 to number 16 are shown.

The analyzed image 220 includes object images 223. The object images 223 are extracted from respective frame images 211 of the source moving image 210, for example. More specifically, the object images 223 may be images obtained by separating a region in which a motion vector exceeds a threshold from a background image other than the region, the motion vector having been calculated from each of the frame images 211. In the diagram, the object images 223 marked with FG1 to FG16 are shown. Note that, the object images 223 are also referred to as foreground (FG) images since the object images 223 are foreground that is in front of the background (BG) image 221.

The analyzed image 220 further includes the background image 221 (BG). As described above, the background image 221 may be a region other than an object extracted from any one of the frame images 211, or may be an image generated by compositing regions other than the object images 223 extracted from the plurality of frame images 223, for example.

Hereinafter, the example of generation of a moving image is explained using the object images 223 and the background image 221 that have been extracted from the source moving image 210 in the example in FIG. 4. Needless to say, the number of frame images 211 may be far more than 16 frame images shown in the diagram. Accordingly, the object images 223 may also be generated far more than 16 object images. However, the object images 223 do not have to respectively correspond with the frame images 211. For example, an object image 223 may be extracted from a plurality of frame images 211.

Moreover, only one background image 221 is not necessarily generated. For example, in a case where the playback time of the source moving image 210 is long and the background in the frame images 211 greatly changes, it may be possible to generate a plurality of background images 221 and to use the background images 221 in order according to change in the backgrounds in the frame images 211 corresponding to respective object images 223.

(2-2. Generation of Moving Image)

FIG. 5 is a diagram illustrating generation of a parallelly animated moving image according to an embodiment of the present disclosure. As described above, according to the present embodiment, the moving image generation unit 130 can select a plurality of object images from a series of object images acquired by the image acquisition unit 120, and generate a parallelly animated moving image in which each of the selected object images are parallelly animated. FIG. 5 shows an example of the generated parallelly animated moving image.

The illustrated parallelly animated moving image 230 includes a frame image 1 to a frame image 4. Such frame images are temporally continuous frame images, and such frame images configure the parallelly animated moving image 230 by being continuously played back at a predetermined frame rate. Note that, in a case where a frame rate is low, the moving image may be recognized as continuous shooting images. Here, the frame image 1 is set as an initial frame image in the parallelly animated moving image 230. The parallelly animated moving image 230 may include additional frame image following after the illustrated four frame images.

In the frame image 1, object images 223*a* (FG1), 223*b* (FG4), 223*c* (FG7), 223*d* (FG10), 223*e* (FG13), and 223*f* (FG16) that have been overlaid on the background image 221 (BG) are shown. Such object images have been selected from the series of object images (object images 223 (FG1 to FG16) shown in FIG. 4). In addition, in the example shown in the diagram, every third object image is selected from the series of object images.

In the next frame image 2, object images FG2, FG5, FG8, FG11, and FG14 that have been overlaid on the identical background image 221 (BG) are shown. Such object images are object images each of which proceeds by one frame (in the source moving image) from the respective object images shown in the frame image 1. In a similar way, in the frame image 3, object images FG3, FG6, FG9, FG12, and FG15 that have been overlaid on the background image 221 (BG) are shown. In addition, in the frame image 4, object images FG1, FG4, FG7, FG10, FG13, and FG 16 that have been overlaid on the background image 221 (BG) are shown.

When the frame image 1 to the frame image 4 are continuously played back, the object image 223*a* (FG1) displayed in the frame image 1 is displayed in a manner that FG1 sequentially changes into FG2, FG3, and FG4 in the frame image 2 to the frame image 4. This change is identical to change in images that is observed when a series of object images 223 is played back while the object image 233*a* is set as a starting point. That is, in the parallelly animated moving image 230, the object image 223*a* is animated. In the present specification, sequential playback of a plurality of images is referred to as being "animated," the plurality of images having been captured in chronological order. In a case where the entire frame image is animated, a moving image (or continuous shooting images) is played back. In a case where an object image overlaid on the common background image is animated, an image of a region (this region differs from one object image to another) of an object to be a foreground of the background image is sequentially played back in chronological order.

In a way similar to the object image 223*a*, the object images 223*b*, 223*c*, 223*d*, and 223*e* (FG4, FG7, FG10, and FG13) that have been displayed in the frame image 1 are sequentially changed and displayed in the frame image 2 to frame image 4. Accordingly, in the illustrated example, it can be said that each of the object images 223*a* to 223*e* is parallelly animated in the parallelly animated moving image 230, the object images 223*a* to 223*e* having been selected from the series of object images.

Note that, such object images have been selected from the series of common object images. Accordingly, for example, when the playback of the parallelly animated moving image 230 progresses, an object image displayed after the object image 223*a* (FG1) reaches the image (FG4) displayed as the object image 223*b* in the frame image 1. Accordingly, it can be said that the display of the object images 223 in each frame image is parallelly animated display of the series of object images performed by setting the object images as starting points.

FIG. 6 is a diagram illustrating an example of a parallelly animated moving image generated in an embodiment of the present disclosure. With reference to FIG. 6, the plurality of object images 223*a*, 223*b*, 223*c*, 223*d*, 223*e*, and 223*f* are overlaid on the background image 221 and displayed in the parallelly animated moving image 230. When the parallelly animated moving image 230 is played back, the object images 223 simultaneously move.

For example, as known from the example shown in FIG. 5 where FG1 of the object images 233 is displayed again in the frame image 4, the object images 223 displayed in the parallelly animated moving image 230 do not flow off, but may be repeatedly displayed without end. Accordingly, for example, after the object image 223*a* displayed in FIG. 6 starts to move, display of a new object image (image identical with the object image 223*a*) may be stared at a time when the object image 223*a* matches with the object image 223*b* that is at the start of display.

In the above explained parallelly animated moving image according to the embodiment of the present disclosure, a plurality of object images selected from a series of object images are parallelly animated. Accordingly, for example, it becomes easy to observe a particular part of movement of the object represented by the series of object images. In a case of a moving image in which a single object image is animated, a particular part of movement of the object is not played back again until the playback is repeated automatically or in response to a user operation after the particular part is once played back. On the other hand, in a case of the parallelly animated moving image, it is repeated that a certain object image plays back a particular part of movement of its object and then another object image plays back the corresponding part. Such moving image may be useful when checking a sports form or a dance form, for example. More specifically, for example, in the example in FIG. 5, every third object images 223*a* to 223*f* displayed in the frame image 1 each proceed by four frames. As a result, in the frame image 4, an object image sequentially displayed after the object image 223*a* reaches FG4 (that has been displayed as the object image 223*b* in the frame image 1), and an object image sequentially displayed after the object image 223*b* reaches FG7 (that has been displayed as the object image 223*c* in the frame image 1). In addition, a second last object image (FG1) from FG4 is newly displayed (similar ways can be applied to the object images 223*c* to 223*f*). As a result, the frame image 4 is the image identical with the frame image 1. With regard to subsequent frame images, patterns identical with the frame image 2 to frame image 4 are repeated. In this way, movement of an object can be played back in a time corresponding to three frames in the parallelly animated moving image 230 of the example shown in FIG. 5, although the movement of the object is played back in a time corresponding to 16 frames in a source moving image. Accordingly, for example, it becomes easy for a user to repeatedly observe a particular part of movement of an object. In addition, a file size of the moving image can be reduced. More specifically, the parallelly animated moving image 230 of the example in FIG. 5 can reuse the frame image 1 to frame image 3 after the frame image 4. Accordingly, the parallelly animated moving image 230 includes data for only three frames, although a moving image in which a single object image is animated includes data for 16 frames.

Moreover, for example, in a case where the object image represents a person in the parallelly animated moving image, a comical scene can be represented since it appears that a plurality of people repeats an identical movement. For example, more comical moving image can be generated if the moving image generation unit 130 plays back a moving image at high speed or plays back the moving image in reverse in response to a user operation acquired by the operation unit 170.

(Supplement)

Note that, in the above example, the moving image generation unit 130 selects the plurality of object images from the series of object images at fixed intervals (every third object image). However, the embodiment of the present disclosure is not limited to such example.

For example, the moving image generation unit 130 may set intervals (for example, time or the number of frames) for selecting a plurality of object images in accordance with a movement speed of an object in a source moving image. More specifically, for example, in a case where the movement speed of the object is high, that is, in a case where spatial intervals between original object images are large, the object images may be selected at shorter intervals. Alternatively, for example, in a case where the movement speed of the object is low, that is, in a case where spatial intervals between the original object images are small, the object images may be selected at longer time intervals. Accordingly, distance between object images displayed in the parallelly animated moving image 230 can be maintained to be an appropriate distance (for example, distance in which the object images are not overlaid with each other too much and there is not too much space between the object images), regardless of the moving speed of the object.

A playback speed (frame rate) of the generated moving image may also be variable. For example, as described above, playback in high speed or reverse playback that are based on a user operation can be possible. In addition, the moving image generation unit 130 may set a playback speed of the parallelly animated moving image 230 in accordance with length of the source moving image. In this case, for example, the playback speed becomes fast when the source moving image is long, and the playback speed becomes slow when the source moving image is short.

As a result, for example, any parallelly animated moving image 230 can be played back in a subequal time regardless of length of the source moving images.

(3. Generation of Moving Image in which a Single Object Image is Animated)

Figure 7:
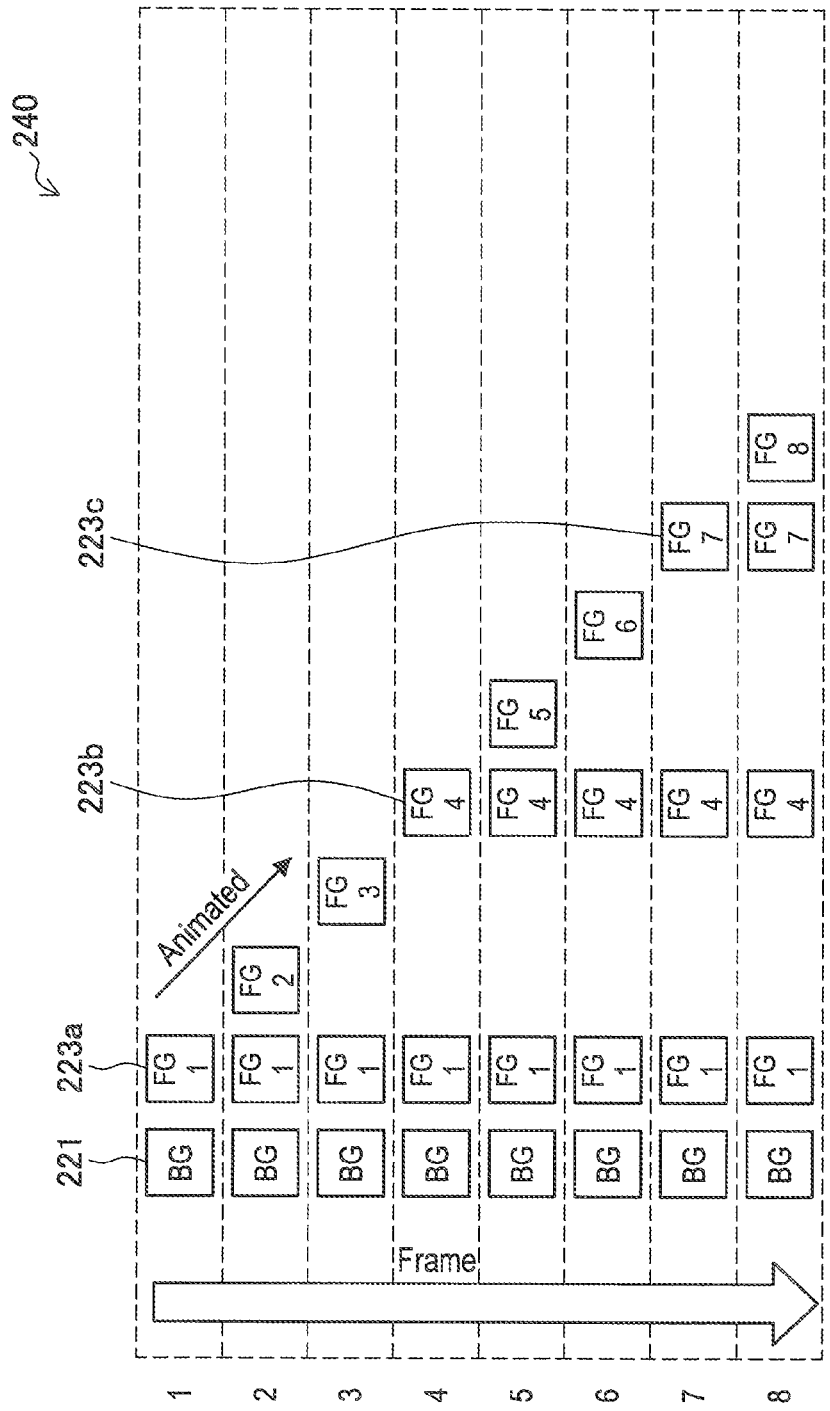
FIG. 7 is a diagram illustrating generation of a singly animated moving image according to an embodiment of the present disclosure.
Figure 8:
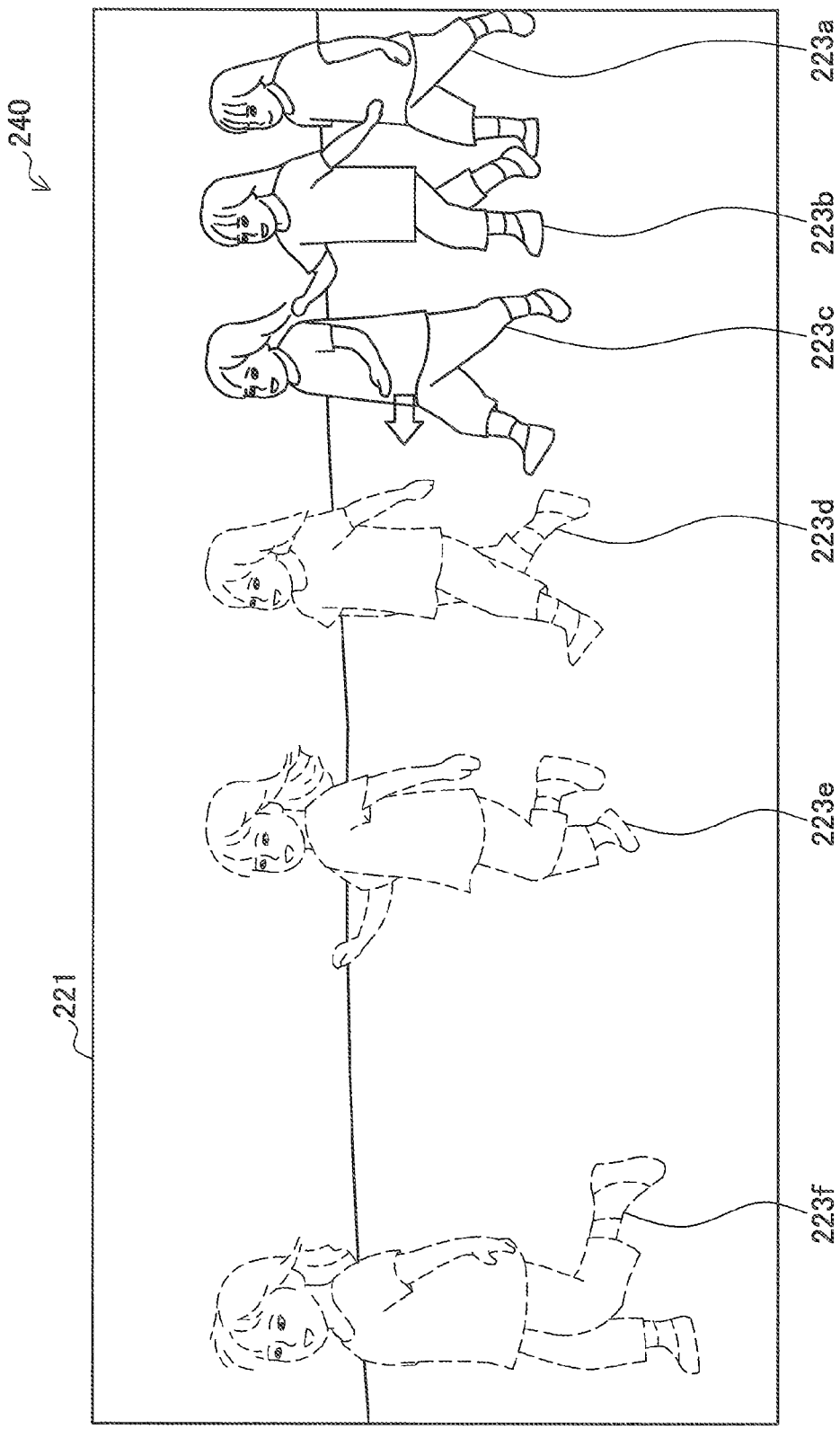
FIG. 8 is a diagram illustrating an example of a singly animated moving image generated in an embodiment of the present disclosure.

Next, with reference to FIGS. 7 and 8, an example of generation of a moving image (singly animated moving image) in which a single object image is animated according to an embodiment of the present disclosure is explained. Note that, a series of object images to be used for generating a moving image is similar to the example of the parallelly animated moving image. Accordingly, repeated explanation is omitted.

FIG. 7 is a diagram illustrating generation of a singly animated moving image according to an embodiment of the present disclosure. As described above, according to the present embodiment, the moving image generation unit 130 can select a single object image from a series of object images acquired by the image acquisition unit 120, and generate a singly animated moving image in which the selected single object images is animated. FIG. 7 shows an example of the generated singly animated moving image.

The illustrated singly animated moving image 240 includes a frame image 1 to a frame image 8. Such frame images are temporally continuous frame images. The singly animated moving image 240 is generated by continuously playing back the frame images at a predetermined frame rate. Note that, in a case where a frame rate is low, the moving image may be recognized as continuous shooting images. Here, the frame image 1 is set as an initial frame image in the singly animated moving image 240. The singly animated moving image 240 may include additional frame image following after the illustrated eight frame images.

In the frame image 1, an object image 223*a* (FG1) overlaid on a background image 221 (BG) are shown. Here, the single object image 223*a* has been selected from the series of object images (object images 223 (FG1 to FG16) shown in FIG. 4).

In the next frame image 2, an object image FG2 overlaid on the identical background image 221 (BG) is shown. This object image is an object image which proceeds by one frame (in the source moving image) from the object image shown in the frame image 1. In addition, the object image of FG1 may remain displayed as an effect of an afterimage. In a similar way, in the frame image 3, object images FG1 and FG3 that are overlaid on the background image 221 (BG) are shown. In the frame image 4, object images FG1 and FG4 that are overlaid on the background image 221 (BG) are shown.

When the frame image 1 to the frame image 4 are continuously played back, the object image 223*a* (FG1) displayed in the frame image 1 is displayed in a manner that FG1 sequentially changes into FG2, FG3, and FG4 in the frame image 2 to the frame image 4. This change is identical to change in images that is observed when a series of object images 223 are played back while the object image 233*a* is set as a starting point. That is, with regard to this moving image, it can be said that the object image 223*a* is animated.

In contrast to the above-described parallelly animated moving image 230, only a single object image 223*a* is animated in the singly animated moving image 2401 shown in the example in FIG. 7. For example, in the frame images 2 to 4, the object image FG1 and the object images FG2 to FG4 are displayed together. However, the object image FG1 is being displayed as the effect of the afterimage and remains stationary. After the frame image 5, the object image 223*b* (FG4) is additionally displayed as an afterimage. After the frame image 7, the object image 223*c* (FG7) is additionally displayed as an afterimage. Accordingly, four object images are displayed together after the frame image 8. However, only an object image (FG8 in a case of frame image 8) displayed subsequent to the object image 223*a* remains animated.

FIG. 8 is a diagram illustrating an example of a singly animated moving image generated in an embodiment of the present disclosure. With reference to FIG. 8, the object images 223*a*, 223*b*, and 223*c* are overlaid on the background image 221 and displayed in the singly animated moving image 240. This shown example is in a state of the frame image 7 in the example in the FIG. 7. In subsequent frame images, the object image 223*c* starts to move and reaches the object images 223*d*, 223*e*, and 223*f* that are shown by broken lines. On the other hand, the object images 223*a* and 223*b* are displayed as the effects of afterimage, and remain stationary in the subsequent frame images.

In the above explained singly animated moving image according to the embodiment of the present disclosure, only a single object image selected from a series of object images is animated. Accordingly, it takes time to express entire movement of an object in the generated moving image. On the other hand, the displayed object images are not overlaid on each other (except the case an object image is displayed as an effect of afterimage such as the above-described example) in the singly animated moving image. Accordingly, the singly animated moving image is suitable for a case where a single object moves without changing its place widely, for example. Accordingly, the moving image generation unit 130 and the image output unit 140 may switch a moving image to be generated and output in response to a user operation or in accordance with a movement amount of an object, for example.

For example, the moving image generation unit 130 may generate a parallelly animated moving image if a movement amount of an object in a source moving mage exceeds a threshold, and the moving image generation unit 130 may generate a singly animated moving image if not. Here, the movement amount is a movement amount of an object in images from start to end of a series of object images (which may be corresponding to time period from start to end of a source moving image), for example. For a case where the movement amount of the object is large, the parallelly animated moving image is suitable, the parallelly animated moving image being able to express entire movement of an object in a short time by simultaneously displaying and animating a plurality of object images. On the other hand, in a case where the movement amount of the object is small, it may be difficult to view the plurality of object images since the object images are simultaneously animated and overlaid on each other. Accordingly, for this case, the singly animated moving image in which the object images are displayed basically without being overlaid on each other is suitable, Moreover, for example, the moving image generation unit 130 may generate a parallelly animated moving image if there are a plurality of objects in a source moving image, and the moving image generation unit 130 may generate a singly animated moving image if not. In a case where there are a plurality of objects, for example, afterimages of object images are displayed as effects like the example of the singly animated moving image shown in FIGS. 7 and 8. Accordingly, a temporally posterior object image is displayed in foreground, and a temporally anterior object image is hidden. On the other hand, displayed object images are each animated in the parallelly animated moving image. Accordingly, some images do not remain hidden, and both temporally posterior object image and temporally anterior object image can be viewed.

(4. Example of GUI)

Next, with reference to FIG. 9, an example of a GUI according to an embodiment of the present disclosure is explained. FIG. 9 is a diagram illustrating the example of the GUI according to the embodiment of the present disclosure.

With reference to FIG. 9, the display control unit 150 in the terminal device 100 causes the display unit 160 to display a GUI screen 300 including a slider 301, a switch button 303, a seek bar 307, a playback speed display 309, an effect list display button 311, a reshooting button 313, and a store/share button 315. An operation input performed on the GUI screen 300 by a user is acquired by a touchscreen included in the operation unit 170, for example.

The slider 301 is shared for setting of the playback speed of a moving image and setting of intervals for selecting a plurality of object images from a series of object images, the settings being for generation of the parallelly animated moving image. For example, in the shown example, the slider 301 is illustrated as a slider between + and −. In a case where the slider 301 is used for setting the playback speed, the playback speed becomes high when the slider 301 approaches a + side, and the playback speed becomes low when the slider 301 approaches a − side. Here, by operating the slider 301 to approach the − side, it may be possible to decrease the playback speed from a forward playback region to a reverse playback region that is less than 0.

In a case where the slider 301 is used for setting predetermined intervals, the intervals become small (object images are displayed more close with each other) when the slider 301 approaches the + side, and the intervals become large (the object images are displayed more far from each other) when the slider 301 approaches the − side. Alternatively, in contrast to the above example, it may be possible that the intervals become large when the slider 301 approaches the + side, and the intervals become small when the slider 301 approaches the − side when the predetermined intervals are set.

The switch button 303 is an example of operation elements for switching functions of the slider 301 between setting of the playback speed and setting of the predetermined intervals. In the shown example, a switch button 303a represents a state where the setting of the playback speed is selected, and a switch button 303b represents a state where the setting of the predetermined intervals is selected.

As another example, the switch button 303 may be replaced with a switch tab 305 as shown in FIG. 9. In the shown example, a switch tab 305a represents a state where the setting of the predetermined intervals is selected, and a switch tab 305b represents a state where the setting of the playback speed is selected.

The seek bar 307 represents a playback position of a moving image during preview. The playback speed display 309 represents a playback speed of the moving image during preview. Accordingly, when operating the slider 301 after selecting a setting function for a playback speed by using the switch button 303, the playback speed of a moving image during preview is changed and the playback speed display 309 is changed. Note that, as an additional configuration, it may be possible to change the playback speed of the moving image by using a direction display 309a displayed at opposite sides of the playback speed display 309 (in the shown example, the direction display 309a represents a direction along the seek bar 307).

The effect list display button 311 is a button for displaying a list used for selecting various effects to be applied to the moving image. For example, the effects may include switch between the parallelly animated moving image (in which a plurality of object images are parallelly animated) and the singly animated moving image (in which a single object is animated) performed by a user operation, existence or non-existence of an afterimage in the singly animated moving image, a fade effect applied to an object image to be displayed, and a setting of a time range in which an object image is animated.

The reshooting button 313 is a button for storing or abandoning a moving image during preview and shooting a new source moving image. The reshooting button may be displayed in a case where the terminal device 100 has a shooting function, for example.

The store/share button 315 is a button for storing or sharing a moving image during preview. When the store/share button 315 is operated, the moving image is stored in a storage in the terminal device 100 (or a storage in a network), or the moving image is uploaded onto a server for sharing moving images via the communication unit 180, for example.

By using the above explained GUI, the user can set intervals between object images to be parallelly animated in a moving image and can set a playback speed of the moving image via a few operation parts, for example. As a result, for example, the operation parts displayed in the GUI screen 300 is simplified, and an area in which a moving image is displayed to be previewed can be widened.

(5. Hardware Configuration)

Next, with reference to FIG. 10, a hardware configuration of an information processing device according to an embodiment of the present disclosure is explained. FIG. 10 is a block diagram showing a hardware configuration example of an information processing device according to the embodiment of the present disclosure. A shown information processing device 900 may achieve the terminal device according to the embodiments of the present disclosure, for example.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933, and a sensor 935, as necessary. The information processing apparatus 900 may include a processing circuit such as a digital signal processor (DSP) or an application specific integrated circuit (ASIC), alternatively or in addition to the CPU 901.

The CPU 901 functions as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is a device which is operated by a user, such as a mouse, a keyboard, a touchscreen, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may be a display device such as a liquid crystal display (LCD), a plasma display panel (PDP), and an organic electro-luminescence (EL) displays, an audio output device such as a speaker or a headphone, or a printer, for example. The output device 917 may output the results obtained from the process of the information processing apparatus 900 in a form of a video such as text or an image, and an audio such as voice or sound.

The storage device 919 is a device for data storage which is configured as an example of a storage unit of the information processing apparatus 900. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the information processing apparatus 900. The connection port 923 may be a universal serial bus (USB) port, an IEEE1394 port, and a small computer system interface (SCSI) port, for example. The connection port 923 may also be an RS-232C port, an optical audio terminal, a high-definition multimedia interface (HDMI) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB) or the like. In addition, the communication device 925 may be a router for optical communication, a router for Asymmetric Digital Subscriber Line (ADSL), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the image formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

In the embodiments of the present disclosure, the information processing device 900 does not have to include the sensor 935. However, in a case where the information processing device 900 includes the sensor 935, location information on an original moving image can be attached to a file of an output image when the location information has been recorded using a GPS at a time when the moving image has been shot so as to upload or store the output image to or in the storage, for example. In addition, for example, it is possible to detect an attribute of a case of the information processing device 900 by using the acceleration sensor, and to decide a display direction of an image to be displayed as a GUI or layout of an operator. In addition, when a tilt effect is applied to the display object image as shown in FIG. 15, a tilt of a case of the information processing device 900 may be reflected in an effect, the tilt having been detected by the acceleration sensor or the gyro sensor.

The example of the hardware configuration of the information processing apparatus 900 has been explained. Each of the above components may be realized using general-purpose members, but may also be realized in hardware specialized in the function of each component. Such a configuration may also be modified as appropriate according to the technological level at the time of the implementation.

(6. Supplement)

In the above-described embodiments, the example that the terminal device functions as the image processing device including the image acquisition unit, the moving image generation unit, the image output unit, and the like has been explained. However, the embodiment of the present disclosure is not limited to such example. For example, the functions of the image processing device may be achieved by a server including one or plurality of information processing devices in a network. In this case, for example, the server may perform image analysis on a source moving image received from the terminal device, extract a series of object images, select a plurality of object images from the series of object images, generate a moving image in which the plurality of display object images are parallelly animated, and transmit the moving image as a preview image to the terminal device. It is also possible for the server to reselect a plurality of object images to be animated in response to an operation input received from the terminal device or to change a playback speed, and then to transmit a new preview image to the terminal device, for example. In addition, the server stores or transmits the generated moving image in response to an operation input received from the terminal device.

The embodiments of the present disclosure can include, for example, the image processing apparatus, the system, the image processing method executed in the image processing device or the system, which are described above, a program for causing the image processing device to function, and a non-transitory tangible medium having a program stored therein.

Although the preferred embodiments of the present disclosure have been described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:
a moving image generation unit configured to generate a parallelly animated moving image in which a plurality of object images are each parallelly animated, the plurality of the object images having been selected from a series of object images that have been generated by extracting a moving object from frame images of a source moving image; and
an image output unit configured to output the parallelly animated moving image.

(2) The image processing device according to (1),
wherein the moving image generation unit selectively generates any one of the parallelly animated moving image and a singly animated moving image in which a single object image is animated, the single object image having been selected from the series of object images.

(3) The image processing device according to (2),
wherein the moving image generation unit generates the parallelly animated moving image in a case where a movement amount of the object exceeds a threshold.

(4) The image processing device according to (2) or (3),
wherein the moving image generation unit generates the parallelly animated moving image in a case where the plurality of objects exist.

(5) The image processing device according to any one of (1) to (4),
wherein the moving image generation unit selects the plurality of object images from the series of object images at predetermined intervals.

(6) The image processing device according to (5),
wherein the moving image generation unit sets the predetermined intervals in accordance with a movement speed of the object.

(7) The image processing device according to (5),
wherein the moving image generation unit sets the predetermined intervals in accordance with a user operation.

(8) The image processing device according to any one of (1) to (7),
wherein the moving image generation unit sets a playback speed of the parallelly animated moving image in accordance with a user operation.

(9) The image processing device according to (8),
wherein the moving image generation unit sets the playback speed within a range including a reverse playback region.

(10) The image processing device according to (8) or (9), further including:
a display control unit configured to cause a display unit to display a graphical user interface (GUI) that receives the user operation for setting the playback speed.

(11) The image processing device according to (10),
wherein the moving image generation unit selects the plurality of object images from the series of object images at predetermined intervals set in accordance with a user operation.

(12) The image processing device according to (11),
wherein the GUI includes a slider shared for setting of the playback speed and setting of the predetermined intervals, and an operation element for switching functions of the slider.

(13) The image processing device according to any one of (1) to (7),
wherein the moving image generation unit sets a playback speed of the parallelly animated moving image in accordance with length of the source moving image.

(14) An image processing method performed by a processor, the method including:
generating a parallelly animated moving image in which a plurality of object images are each parallelly animated, the plurality of the object images having been selected from a series of object images that have been generated by extracting a moving object from frame images of a source moving image; and
outputting the parallelly animated moving image.

(15) The image processing method according to (14), further including:

selectively generating any one of the parallelly animated moving image and a singly animated moving image in which a single object image is animated, the single object image having been selected from the series of object images.

(16) The image processing method according to (15), further including:

generating the parallelly animated moving image in a case where a movement amount of the object exceeds a threshold.

(17) A program for causing a computer to achieve:

a function of generating a parallelly animated moving image in which a plurality of object images are each parallelly animated, the plurality of the object images having been selected from a series of object images that have been generated by extracting a moving object from frame images of a source moving image; and a function of outputting the parallelly animated moving image.

(18) The program according to (14), further including:

a function of selectively generating any one of the parallelly animated moving image and a singly animated moving image in which a single object image is animated, the single object image having been selected from the series of object images.

(19) The program according to (18), further including:

a function of generating the parallelly animated moving image in a case where a movement amount of the object exceeds a threshold.

What is claimed is:

1. An image processing device comprising:
a moving image generation circuitry configured to selectively generating a parallelly animated moving image in which a plurality of object images are each parallelly animated so as to visually create a simultaneous movement in the plurality of object images, the plurality of the object images having been selected from a series of object images that have been generated by extracting a moving object from frame images of a source moving image; and
an image output circuitry configured to output the parallelly animated moving image, wherein
the moving image generation circuitry selectively generates any one of the parallelly animated moving image and a singly animated moving image in which a single object image is animated, the single object image having been selected from the series of object images, and
the moving image generation circuitry generates the parallelly animated moving image in a case where a movement amount of the object exceeds a threshold.

2. The image processing device according to claim 1, wherein the moving image generation circuitry generates the parallelly animated moving image in a case where the plurality of objects exist.

3. The image processing device according to claim 1, wherein the moving image generation circuitry selects the plurality of object images from the series of object images at predetermined intervals.

4. The image processing device according to claim 3, wherein the moving image generation circuitry sets the predetermined intervals in accordance with a movement speed of the object.

5. The image processing device according to claim 3, wherein the moving image generation circuitry sets the predetermined intervals in accordance with a user operation.

6. The image processing device according to claim 1, wherein the moving image generation circuitry sets a playback speed of the parallelly animated moving image in accordance with a user operation.

7. The image processing device according to claim 6, wherein the moving image generation circuitry sets the playback speed within a range including a reverse playback region.

8. The image processing device according to claim 6, further comprising:
a display control circuitry configured to cause a display unit to display a graphical user interface (GUI) that receives the user operation for setting the playback speed.

9. The image processing device according to claim 8, wherein the moving image generation circuitry selects the plurality of object images from the series of object images at predetermined intervals set in accordance with a user operation.

10. The image processing device according to claim 9, wherein the GUI includes a slider shared for setting of the playback speed and setting of the predetermined intervals, and an operation element for switching functions of the slider.

11. The image processing device according to claim 1, wherein the moving image generation circuitry sets a playback speed of the parallelly animated moving image in accordance with length of the source moving image.

12. An image processing method performed by a processor, the method comprising:
selectively generating a parallelly animated moving image in which a plurality of object images are each parallelly animated so as to visually create a simultaneous movement in the plurality of object images, the plurality of the object images having been selected from a series of object images that have been generated by extracting a moving object from frame images of a source moving image;
selectively generating any one of the parallelly animated moving image and a singly animated moving image in which a single object image is animated, the single object image having been selected from the series of object images;
generating the parallelly animated moving image in a case where a movement amount of the object exceeds a threshold; and
outputting the parallelly animated moving image.

13. The image processing method according to claim 12, further comprising:
setting a playback speed of the parallelly animated moving image in accordance with a user operation.

14. The image processing method according to claim 13, further comprising:
setting the playback speed within a range including a reverse playback region.

15. The image processing method according to claim 13, further comprising:
causing a display unit to display a graphical user interface (GUI) that receives the user operation for setting the playback speed.

16. The image processing method according to claim 15, further comprising:
selecting the plurality of object images from the series of object images at predetermined intervals set in accordance with a user operation.

17. The image processing method according to claim 16, wherein the GUI includes a slider shared for setting of the playback speed and setting of the predetermined intervals, and an operation element for switching functions of the slider.

18. A non-transitory computer-readable medium storing thereon instructions that, when executed by a processor of a computer, cause the computer to perform operations comprising:
   selectively generating a parallelly animated moving image in which a plurality of object images are each parallelly animated so as to visually create a simultaneous movement in the plurality of object images, the plurality of the object images having been selected from a series of object images that have been generated by extracting a moving object from frame images of a source moving image;
   selectively generating any one of the parallelly animated moving image and a singly animated moving image in which a single object image is animated, the single object image having been selected from the series of object images;
   generating the parallelly animated moving image in a case where a movement amount of the object exceeds a threshold; and
   outputting the parallelly animated moving image.

\* \* \* \* \*